United States Patent [19]

Greene

[11] Patent Number: 5,420,795
[45] Date of Patent: May 30, 1995

[54] NAVIGATIONAL SYSTEM FOR DETERMINING AND DISPLAYING THE POSITION OF A VESSEL ON A NAVIGATIONAL CHART

[76] Inventor: Leonard M. Greene, 6 Hickory La., Scarsdale, N.Y. 10583

[21] Appl. No.: 300,352

[22] Filed: Sep. 2, 1994

Related U.S. Application Data

[63] Continuation of Ser. No. 986,708, Dec. 8, 1992, abandoned.

[51] Int. Cl.6 .................. G01C 21/00; G01C 21/20
[52] U.S. Cl. ..................... 364/443; 364/444; 364/449; 340/995; 353/12
[58] Field of Search .............. 364/443, 444, 449; 340/995; 353/12

[56] References Cited

U.S. PATENT DOCUMENTS

| 3,178,682 | 4/1965 | Wright et al. | |
| 3,249,914 | 5/1966 | Smart. | |
| 3,475,754 | 2/1968 | Scovill | 364/444 |
| 3,486,816 | 12/1969 | Streeter | 364/444 |
| 3,997,255 | 12/1976 | Van Oosten | 353/12 |
| 4,240,722 | 12/1980 | Brecht | 353/12 |
| 4,253,150 | 2/1981 | Scovill | 364/444 |
| 4,312,577 | 1/1982 | Fitzgerald | 364/444 |
| 4,468,743 | 8/1984 | Dunn et al. | 364/520 |
| 4,494,201 | 1/1985 | Reymond et al. | 364/443 |
| 4,862,374 | 8/1989 | Ziemann | 364/449 |
| 5,024,523 | 6/1991 | Jerie | 353/12 |
| 5,052,799 | 10/1991 | Sasser et al. | 364/443 |
| 5,059,970 | 10/1991 | Raubenheimer et al. | 342/451 |
| 5,089,816 | 2/1992 | Holmes, Jr. | 340/995 |
| 5,115,399 | 5/1992 | Nimura et al. | 364/449 |
| 5,202,829 | 4/1993 | Geier | 364/449 |
| 5,214,757 | 5/1993 | Mauney et al. | 364/449 |

Primary Examiner—Kevin J. Teska
Assistant Examiner—Tyrone V. Walker
Attorney, Agent, or Firm—Bacon & Thomas

[57] ABSTRACT

A navigational system for determining and displaying the position of a vessel on a navigational chart includes an optical projection system for establishing first and second reference points on the chart. The system also includes a computer and a keyboard or the like for entering the longitudinal and latitudinal coordinates of the first and second reference points in the computer. A GPS or Loran receiver is also tied into the computer so that the present position of the vessel can be projected onto the chart.

15 Claims, 1 Drawing Sheet

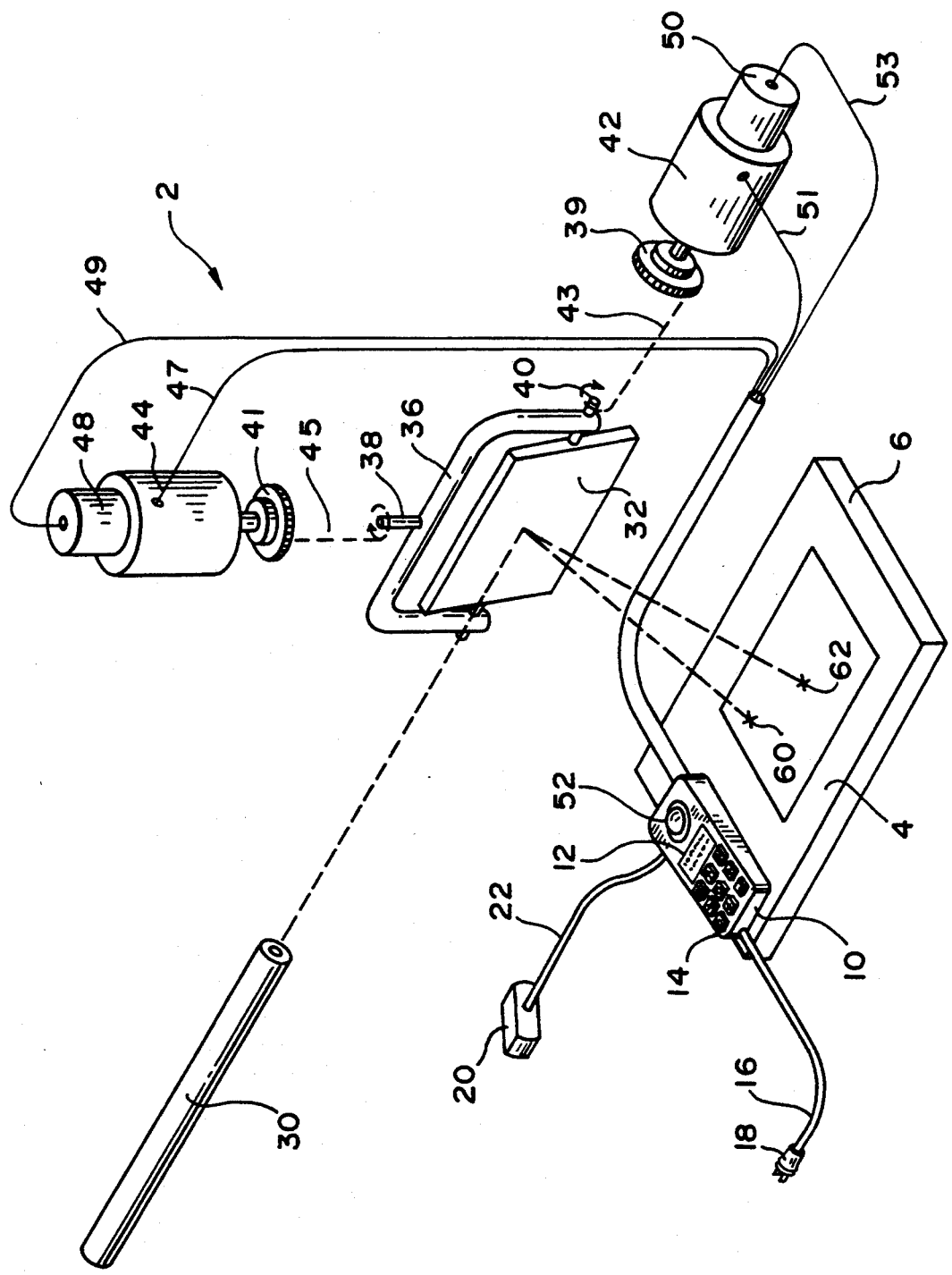

NAVIGATIONAL SYSTEM FOR DETERMINING AND DISPLAYING THE POSITION OF A VESSEL ON A NAVIGATIONAL CHART

This application is a continuation of application Ser. No. 07/986,708, filed Dec. 8, 1992, now abandoned.

FIELD OF THE INVENTION

This invention relates to a navigational system and, more particularly, to a navigational system for determining and displaying the position of a vessel on a navigational chart.

BACKGROUND OF THE INVENTION

Devices for automatically plotting a progression of positions in relation to a map or other representation of a navigational chart are well-known. For example, U.S. Pat. No. 4,468,743 (Dunn et al.) discloses a plotting device which is controlled by a microelectronic processor. The microelectronic processor drives a pen across a paper chart which is replaced after several plots. The Dunn et al. devices are best suited for a stable or sheltered environment which is inconsistent with the needs in smaller sailing vessels.

A more recent development in the field of navigational plotting systems is disclosed in U.S. Pat. No. 4,862,374 (Ziemann). The system disclosed therein includes a light-transmissive LCD graphical display. The light-transmissive graphical display serves as a window-like element in relation to a map or chart which is placed underneath it. The map or chart is calibrated to the plotter by moving a calibration cursor on the display to two known points which are diagonally displaced on the map and by entering the latitude and longitude of the known positions. Navigational positions are then related to these points and displaced at the appropriate locations on the display, i.e., over the appropriate locations on the underlying map.

Other electronic chart displays for boats are available. However, such displays generally produce relatively small printouts which are difficult to read or entail a somewhat cumbersome system which is not suitable for smaller vessels, such as a sail boat or motor yacht. Accordingly, it is desirable to provide a system which enables an individual to use conventional navigational charts for navigation. At the same time, the system should coordinate or scale navigational information from a Loran or GPS (Global Positioning System) receiver to the same scale as used on the chart. After coordinating the incoming information, the system should display the information, i.e., the position of the vessel directly onto the chart and at the same time allowing the individual to manually plot courses directly on the chart.

It is presently believed that a navigational system in accordance with the present invention provides the aforementioned desirable features. Such systems are also relatively compact and therefore suitable for use on sailboats or other yachts. Such systems can also be marketed at a competitive price and are suitable for working in subdued lighting, which is a typical environment on sailboats.

SUMMARY OF THE INVENTION

Briefly, a navigational system for a vessel or the like in accordance with the present invention comprises a computer which includes memory means, a navigational chart and optical scanning means for establishing first and second reference points on the chart. The optical scanning means is spaced from the chart but arranged to project a beam of light onto the chart to thereby indicate the first and second reference points. The system also includes means for entering the coordinates, such as longitudinal and latitudinal coordinates, of the first and second reference points into the memory means location receiving means and means for inputting the coordinates provided by the location receiving means are also provided. The system also includes means including the computer for coordinating the inputted coordinates and for displaying the location of the vessel on the chart.

The invention will now be described in connection with the accompanying drawing.

DESCRIPTION OF THE DRAWING

FIG. 1 is an isometric view of a navigational system in accordance with a presently preferred embodiment of the invention.

DESCRIPTION OF THE PREFERRED EMBODIMENT OF THE INVENTION

As illustrated in FIG. 1, a navigational system 2 in accordance with the present invention includes a navigational chart 4 which is shown schematically on a chart table or other suitable base 6. A pair of clamps or the like (not shown) may also be provided to hold the chart 4 in a preselected position on the base 6.

The navigational system 2 also includes a computer/control unit 10 which may be mounted on or placed in the proximity of the base 6. The computer control unit 10 includes a screen such as a LCD display 12 and key pad 14. The key pad 14 will also include numeral keys (not shown) for entering the longitude and latitude of reference points as will be explained hereinafter. The computer/control unit 10 is connected to a power source by cord 16 and plug 18 in a conventional manner.

A receiver 20, such as a Global Positioning Satellite System or a Loran receiver, is connected to computer/control unit 10 by cord 22 for inputting the longitudinal and latitudinal coordinates of the present position or location of the vessel as received by the GPS receiver 20 into the computer/control unit 10 and/or into the memory thereof.

An optical scanning system includes a source of light such as a laser 30 for projecting a light beam onto a mirror 32 which redirects or reflects the light beam onto the chart 4. The mirror 32 is preferably mounted above the base 6 in a gimbal 36 which includes a vertical shaft 38 and horizontal shaft 40. The shafts 38 and 40 and mirror 32 are rotated by motors 42 and 44 by means of drive gears 39 and 41 through conventional gear-trains which are indicated by broken lines 43 and 45.

The motors 42 and 44 are controlled by the computer/control unit 10 or other input means and by x encoder 48 and y encoder 50 in a conventional manner. The x encoder 48 and motor 44 are connected by the computer/control unit 10 by means of leads 47 and 49 while the y encoder 50 and motor 42 are connected to the computer/control unit 10 by leads 51 and 53.

In the practice of the invention, a navigational chart 4 is placed on the table or base 6 and positioned to display a preselected portion thereof. Navigational charts are normally relatively large and are folded to display a preselected portion. This portion may, for example, be clamped to or fastened to the base by any suitable means (not shown).

After positioning the chart 4 on base 6, a light spot is projected onto the chart 4 by the laser 30. The laser 30 projects the beam of light toward the mirror 32 which reflects the light onto the chart 4. Other optical projection means, such as a light source and projection lens, could be substituted for the laser in projecting a suitable target onto the chart 4.

In using the navigational system, as disclosed herein, an individual moves the light spot on the chart 4 to a first preselected reference point by means of the curser move keys on keypad 14 or by means of a tracking ball 52. The tracking ball 52 functions in the same manner as an electronic mouse except that it moves the light spot by moving mirror 32. The longitude and latitude of the first preselected reference point are entered into the computer/control unit 10 by means of keypad 14 while the light spot is so positioned.

A second preselected reference point is selected on chart 4 and the light spot is moved to that position in the same manner as mentioned above. The longitude and latitude of the second reference point is then entered into the computer/control unit 10 by means of keypad 14 with the light spot in that position. The longitude and latitude of the second reference point may also be illustrated on display 12. The correlated position of the light spots are automatically registered in the memory portion of the computer/control unit 10. This enables the computer to compute the latitude and longitude of any subsequent position of the light spot and display it on a monitor screen as will be well understood by those skilled in the art.

Accordingly, all of the computer route planning and even automatic navigation and tracking, can be achieved with printed, large scale charts and/or with a computer's smaller scale charts. Also, if the large scale chart 4 is removed from the table or base 6 or inadvertently displaced thereon, it can be readily replaced and reoriented by the same pinpointing method without voiding the validity of the route planning that was previously entered into the computer. Also, the present position of the vessel is shown directly on the chart by means of the input from the GPS or Loran receiver.

While the invention has been described in connection with one of its preferred embodiments, it should be understood that changes and modifications may be made without departing from the scope of the appended claims.

What is claimed is:

1. A navigational system for determining and displaying the position of a vessel on a navigational chart comprising a computer including memory means, a printed navigational chart, optical scanning means including a source of light for projecting a spot of light onto said printed navigational chart separated from said navigational chart and means for positioning said navigational chart at a distance from said optical scanning means, means including said optical scanning means for establishing first and second reference points on said printed navigational chart, and means for entering the coordinates of the first and second reference points in said memory, detecting and inputting means for detecting and inputting the vessel's position data into said memory, means including said computer for coordinating the coordinates of the first and second reference points from said navigational chart and in said memory and the vessel's position data, and means for displaying the vessel's position on said printed navigational chart.

2. A navigational system in accordance with claim 1 wherein said optical scanning means includes a movable mirror and means for projecting a beam of light onto said chart by way of said mirror.

3. A navigational system in accordance with claim 2 which includes control means operably connected to said computer and in which said mirror is operatively connected to said control means for projecting a light spot onto a preselected reference point on said chart.

4. A navigational system in accordance with claim 1 wherein said means for entering the coordinates of the first and second reference points are adapted to enter the longitudinal and latitudinal coordinates of each of the reference points into said memory.

5. A navigational system in accordance with claim 4 wherein said means for inputting position data includes communication circuitry that is connectable to a navigational receiver for receiving position data signals.

6. A navigational system in accordance with claim 5 wherein said computer memory means is adapted to store a series of positional data signals over time to constitute a navigational path.

7. A navigational system in accordance with claim 6 which includes means for relating the positional data signals to the reference points on said chart.

8. A navigational system in accordance with claim 7 which includes means for applying scaling factors to the positional data signals to display the location of a vessel on the chart.

9. A navigational system in accordance with claim 3 wherein said optical scanning means is a laser.

10. A navigational system for a vessel or the like having a position input system for assisting vessel navigation and for displaying the position on a printed navigational chart comprising:
a navigational chart and optical projecting means including a source of light spaced from said printed navigational chart and constructed and arranged to project a beam of light onto said navigational chart;
means for supporting said chart in a first position with respect to said optical projecting means and at a distance from said optical projecting means for scanning with the light beam;
first input means for inputting first and second reference points on said chart as identified by said projecting means;
second input means for inputting the longitudinal and latitudinal coordinates of said first and second reference points;
location information receiving means for receiving positional data for a vessel and third input means for inputting positional data of the vessel;
computer means including memory means for storing the longitudinal and latitudinal positional information on the first, and second reference points and for coordinating the positional data and the reference data and means for displaying positional data on said chart.

11. A navigational system in accordance with claim 10 wherein said optical scanning means includes a movable mirror and means for moving said mirror to thereby position a light spot on a preselected location on said chart.

12. A navigational system in accordance with claim 10 wherein said third input means is a global positioning system.

13. A navigational system in accordance with claim 10 which includes a tracking ball for positioning the light beam.

14. A navigational system in accordance with claim 10 which includes a keypad for entering the longitudinal and latitudinal coordinates of the selected reference points.

15. A method for determining and displaying the position of a vessel on a printed navigational chart comprising the steps of:
(a) providing a computer including a memory, a printed navigational chart and optical scanning means including a source of light for projecting a spot of light onto the printed navigational chart;
(b) positioning the navigational chart at a distance from the optical scanning means and fixing the navigational chart in that position;
(c) establishing first and second reference points on said printed navigational chart by projecting a beam of light onto the chart;
(d) entering the coordinates of the first and second reference points from said printed navigational chart into the computer memory;
(e) detecting and inputting the vessel's position data and coordinating the coordinates of the first and second reference points from said printed navigational chart with the vessel's position data; and
(f) displaying the vessel's position on the printed navigational chart.

* * * * *